(12) United States Patent
Okada (10) Patent No.: US 7,400,349 B2
(45) Date of Patent: Jul. 15, 2008

(54) ELECTRONIC CAMERA AND IMAGE PROCESSING METHOD

(75) Inventor: Sadami Okada, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 702 days.

(21) Appl. No.: 10/743,717

(22) Filed: Dec. 24, 2003

(65) Prior Publication Data

US 2004/0135906 A1  Jul. 15, 2004

(30) Foreign Application Priority Data

Dec. 25, 2002  (JP)  ............................. 2002-373944
Dec. 17, 2003  (JP)  ............................. 2003-419917

(51) Int. Cl.
  *H04N 5/76*  (2006.01)
  *H04N 5/262*  (2006.01)

(52) U.S. Cl. ................................. 348/231.3; 348/239

(58) Field of Classification Search ............... 358/3.28; 382/100; 713/176; 348/239, 231.3, 231.6
See application file for complete search history.

(56) References Cited

U.S. PATENT DOCUMENTS

| | | | | |
|---|---|---|---|---|
| 5,862,218 | A * | 1/1999 | Steinberg | 713/176 |
| 6,574,008 | B1 * | 6/2003 | Yokose et al. | 358/1.17 |
| 6,888,569 | B2 * | 5/2005 | Fox et al. | 348/239 |
| 6,965,996 | B2 | 11/2005 | Hirano et al. | |
| 2002/0051140 | A1 * | 5/2002 | Yamada | 358/1.5 |
| 2003/0033529 | A1 * | 2/2003 | Ratnakar et al. | 713/176 |
| 2003/0061489 | A1 * | 3/2003 | Pelly et al. | 713/176 |
| 2003/0149879 | A1 * | 8/2003 | Tian et al. | 713/176 |
| 2003/0179901 | A1 * | 9/2003 | Tian et al. | 382/100 |
| 2006/0078157 | A1 * | 4/2006 | Bruekers et al. | 382/100 |

FOREIGN PATENT DOCUMENTS

| | | |
|---|---|---|
| JP | A-08-070432 | 3/1996 |
| JP | A 11-296661 | 10/1999 |
| JP | A 2000-151411 | 5/2000 |
| JP | A 2000-358154 | 12/2000 |
| JP | A-2001-024875 | 1/2001 |
| JP | A 2002-125184 | 4/2002 |
| JP | 2002281435 A * | 9/2002 |
| JP | A 2002-369065 | 12/2002 |

* cited by examiner

*Primary Examiner*—Lin Ye
*Assistant Examiner*—Jason Whipkey
(74) *Attorney, Agent, or Firm*—Oliff & Berridge, PLC (57) ABSTRACT

An electronic camera that creates an image file by processing image data obtained through an image-capturing operation, includes: an image-capturing unit that generates the image data by capturing a subject image; a data extraction unit that sets an image plane range corresponding to an image portion of the image data and extracts data of the image portion in the image plane range; a data insertion unit that writes data of a predetermined specific image over the image plane range of the image data and generates data of a processed image; and a file creation unit that creates an image file by storing the data of the processed image into an image data area of the image file, which is referenced as image data and storing the data of the image portion into a non-image data area of the image file which is not referenced as image data.

10 Claims, 7 Drawing Sheets

IMAGE INSERTED AT PERIPHERY OF IMAGE PLANE

32 SPECEIFIC IMAGE

33 TWO -DIMENSIONAL BAR CODE

FIG. 3B

IMAGE INSERTED AT CENTER OF IMAGE PLANE

FIG. 3C

SEMITRANSPARENT IMAGE INSERTED

ELECTRONIC CAMERA AND IMAGE PROCESSING METHOD

INCORPORATION BY REFERENCE

The disclosure of the following priority application is herein incorporated by reference: Japanese Patent Application No. 2002-373944 filed Dec. 25, 2002.

BACKGROUND OF THE INVENTION

1. Field of the Invention

The present invention relates to an electronic camera that inserts a visible specific image (a so-called digital watermark) indicating a copyright or the like into a captured image in such a manner that the original image can be restored later.

The present invention also relates to an image processing method adopted to restore an original image by removing a specific image from an image file created in an electronic camera or the like.

2. Description of the Related Art

There are digital watermarking technologies known in the related art whereby a digital watermark is embedded in image data. For instance, Japanese Laid Open Patent Publication No. 2000-358154 discloses a method of embedding a visible digital watermark in image data by altering the color of a portion of the image data within a specific range.

In addition, Japanese Laid Open Patent Publication No. 2000-151411 discloses a method whereby a digital watermark is attached after first decoding compressed data resulting from image compression and then the image is compressed again.

When major sporting events, such as the Olympic Games, take place, great volumes of image data of images photographed by a plurality of contract photographers are gathered at a newspaper publisher or the like. Under such circumstances, it is desirable that the newspaper publisher handling such large volumes of image data be able to distinguish at-a-glance a specific photographer, a specific event or the like quickly, simply by looking at each set of image data.

In addition, the photographer will be able to subsequently claim copyright with great ease to image data he is dispatching if the image data are distributed in a state that will enable at-a-glance identification of the photographer.

Accordingly, the inventor of the present invention conceived that such needs might be satisfied by attaching visible information indicating a copyright or the like to image data in an electronic camera.

However, it will be difficult to attach information indicating copyright or the like in a legible state by adopting the method disclosed in Japanese Laid Open Patent Publication No. 2000-358154, in which the color within a specific image plane range of the image data is altered. In addition, the method disclosed in Japanese Laid Open Patent Publication No. 2000-151411 requires compressed data to be first decoded before attaching a digital watermark and then the data to undergo image compression again. For this reason, the onus of the processing executed in the electronic camera is heavy, leading to problems such as a lower photographing speed per frame.

SUMMARY OF THE INVENTION

The present invention provides an electronic camera that attaches a visible specific image indicating copyright or the like to a captured image without imposing a heavy processing onus on the camera and an image processing method through which the image is restored.

An electronic camera according to the present invention that creates an image file by processing image data obtained through an image-capturing operation, comprises: an image-capturing unit that generates the image data by capturing a subject image; a data extraction unit that sets an image plane range corresponding to an image portion of the image data and extracts data of the image portion in the image plane range; a data insertion unit that writes data of a predetermined specific image over the image plane range of the image data and generates data of a processed image; and a file creation unit that creates an image file by storing the data of the processed image into an image data area of the image file, which is referenced as image data and storing the data of the image portion into a non-image data area of the image file which is not referenced as image data.

In this electronic camera, it is preferred that the file creation unit includes an encryption unit that encrypts the data of the image portion and stores the data encrypted by the encryption unit into the non-image data area.

Also, it is preferred that: there is further provided an image compression unit that generates compressed data by executing image compression on the image data generated by the image-capturing unit; the data extraction unit extracts data corresponding to the image plane range from the compressed data as data of the image portion; and the data insertion unit writes compressed data of the specific image over the data corresponding to the image plane range in the compressed data. In this case, it is preferred that: the image compression unit inserts marker code indicating a position within an image plane in the image data while generating the compressed data; the data extraction unit extracts the data corresponding to the image plane range as the data of the image portion based upon the marker code; and the data insertion unit writes the compressed data of the specific image over the data corresponding to the image plane range based upon the marker code.

Also, it is preferred that the predetermined specific image includes information related to copyright.

Also, it is preferred that the predetermined specific information includes at least information indicating a photographer name or a photographing date/time.

An image processing method according to the present invention for restoring an image comprises steps of: obtaining the image file created in the above electronic camera; reading out the data of the processed image from the image data area of the image file; reading out the data of the image portion from the non-image data area of the image file; specifying the data of the specific image in the data of the processed image; and writing the data of the image portion over the specified data of the specific image.

Another image processing method according to the present invention for restoring an image comprises steps of: obtaining the image file which is created in the above electronic camera and has the encrypted data in the non-image data area; reading out the data of the processed image from the image data area of the image file; reading out the encrypted data of the image portion from the non-image data area of the image file; obtaining the data of the image portion by decrypting the encrypted data of the image portion; specifying the data of the specific image in the data of the processed image; and writing the data of the image portion over the specified data of the specific image.

Another image processing method according to the present invention for restoring an image comprises steps of: obtaining the image file which is created in the above electronic camera and has the encrypted data into which marker codes indicating positions within the image plane are inserted; reading out the compressed data containing the marker code from the image data area of the image file; reading out the compressed data stored as the data of the image portion from the non-image data area of the image file; specifying the compressed data of the specific image contained in the compressed data based upon the marker code included in the compressed data; and writing the compressed data constituting the data of the image portion having been read out over the specified compressed data of the specific image.

An image file creating method according to the present invention for creating an image file by processing image data obtained through an image-capturing operation, comprises steps of: obtaining the image data by capturing a subject image; setting an image plane range corresponding to a portion of the image data and extracting data of an image portion from the image plane range; generating data of a processed image by writing the data of a predetermined specific image over the image plane range of the image data; storing the data of the processed image into an image data area of the image file which is referenced as image data; and storing the data of the image portion into a non-image data area of the image file which is not referenced as image data.

A computer-readable computer program product according to the present invention has an image processing program for restoring an image, and the image processing program achieves one of the above mentioned image processing methods.

It is preferred that: the above mentioned image file is a JPEG file; and the file creation unit stores the data of the processed image into a frame in the JPEG file and stores the data of the image portion into an application segment in the JPEG file.

DESCRIPTION OF THE PREFERRED EMBODIMENTS

The following is an explanation of the embodiments of the present invention, given in reference to the drawings.

First Embodiment

Figure 1:
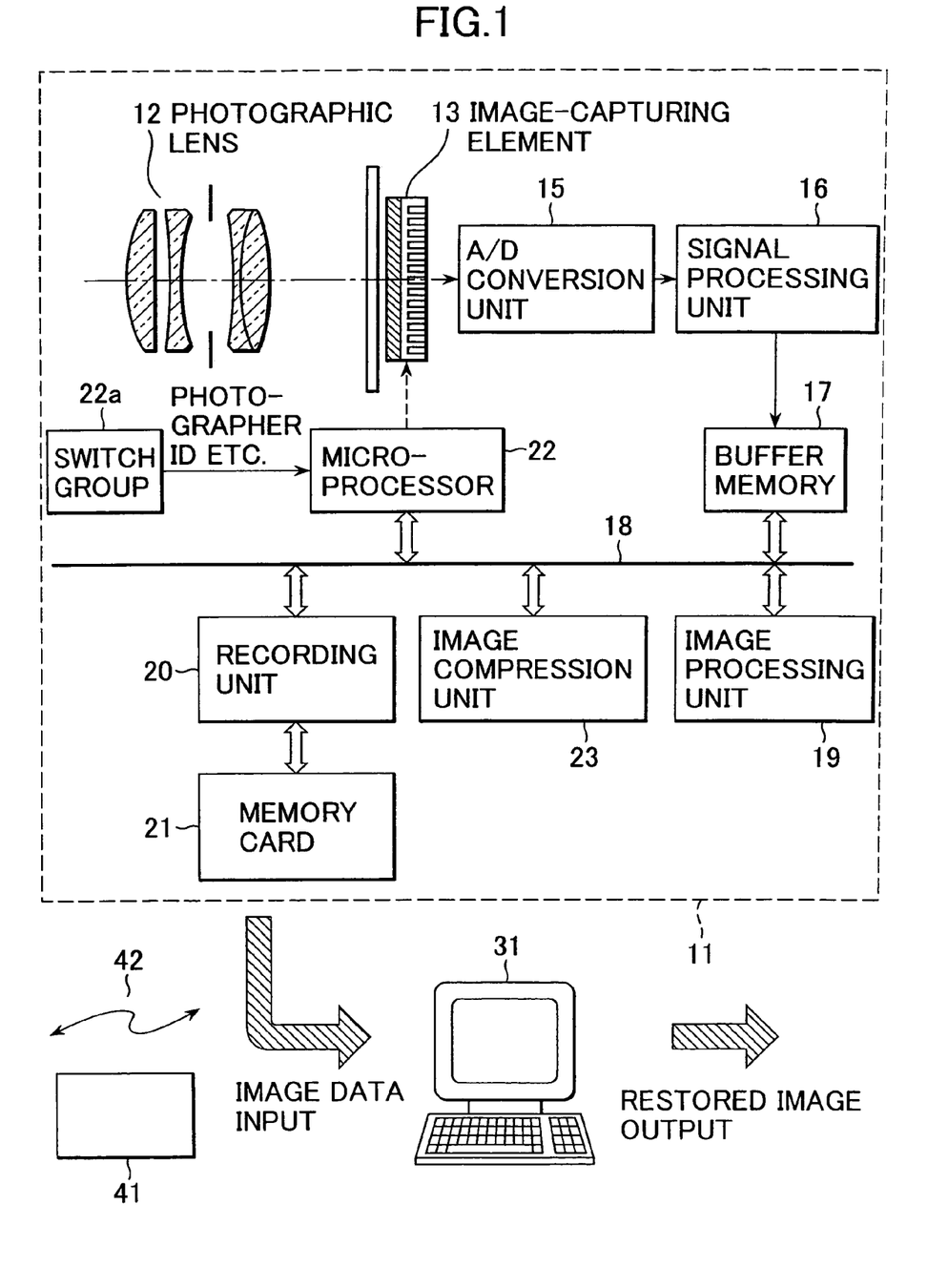
FIG. 1 shows the structure adopted in the electronic camera 11 in a first embodiment.

FIG. 1 shows the structure of an electronic camera 11 achieved in the first embodiment. First, in reference to FIG. 1, the electronic camera 11 is briefly explained.

As shown in FIG. 1, a photographic lens 12 is mounted at the electronic camera 11. An image-capturing element 13 is disposed in the image space of the photographic lens 12. Image data generated at the image-capturing element 13 are digitized to become data with 12-bit gradations via an A/D conversion unit 15 and the digital data are then provided to a signal processing unit 16. The signal processing unit 16 executes signal processing such as black level correction and defective pixel correction on the image data. The image data having undergone the signal processing are temporarily stored into a buffer memory 17. The buffer memory 17 is connected to a bus 18. The bus 18 is also connected with an image processing unit 19, a recording unit 20, a microprocessor 22, an image compression unit 23 and the like.

The image processing unit 19 executes image processing such as color interpolation on the image data in the buffer memory 17. The image compression unit 23 executes JPEG compression on the image data having undergone the image processing and thus generates JPEG compressed data (data stream).

The microprocessor 22 attaches a predetermined specific image to the JPEG compressed data as a digital watermark and creates a JPEG file. The recording unit 20 records the JPEG file thus created into a memory card 21.

In addition, a group of switches 22a through which various types of information are input, modes are set and a shutter release operation is executed, is provided at the electronic camera 11. Data input through the group of switches 22a are then input to the microprocessor 22.

It is to be noted that FIG. 1 also shows a computer 31 utilized to process the JPEG file created at the electronic camera 11 on the outside of the camera.

Operation Executed in the First Embodiment

Figure 2:
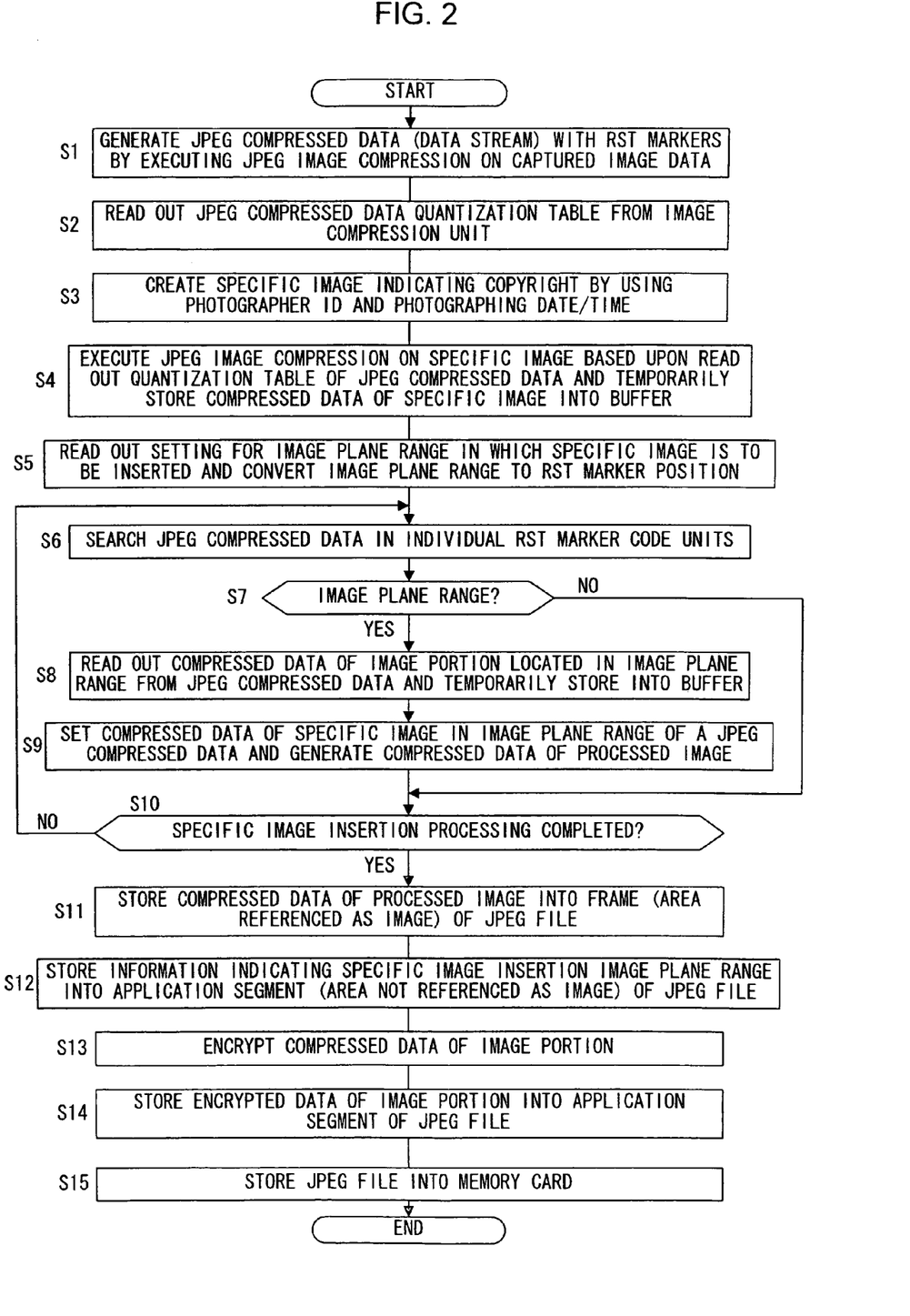
FIG. 2 presents a flowchart of the specific image inserting operation executed in the first embodiment.

FIG. 2 presents a flowchart of the specific image insertion processing which constitutes the operation characterizing the present invention.

Figure 3A:
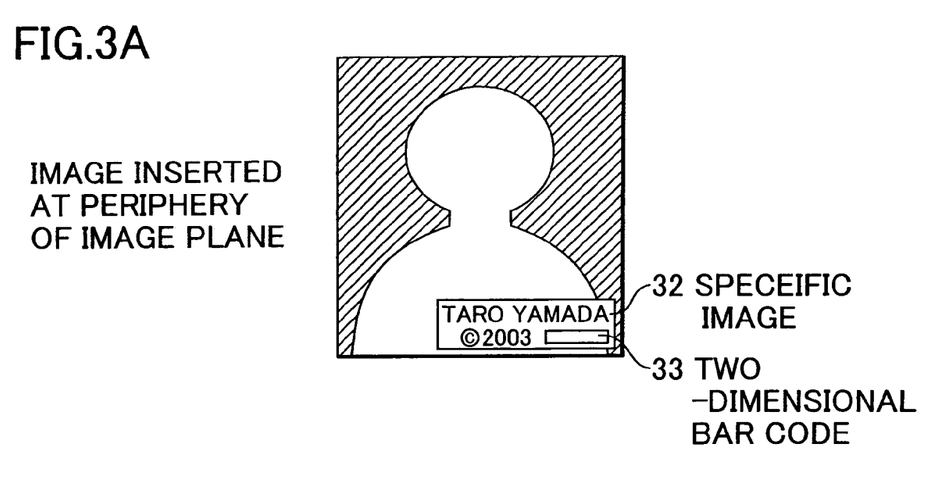
FIGS. 3A to 3C present examples of image plane ranges over which the specific image may be inserted.
Figure 3B:
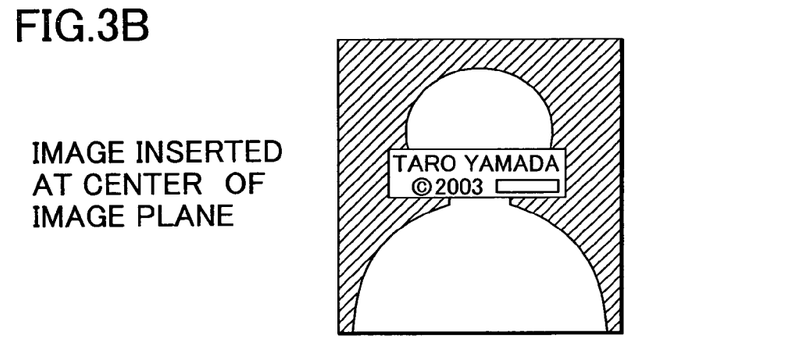
Figure 3C:
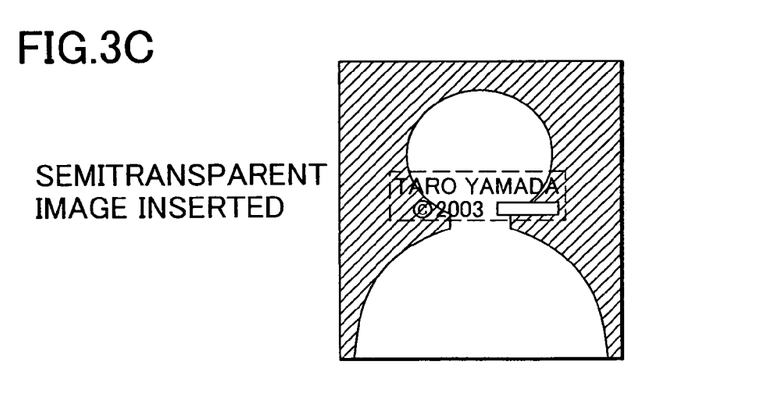
Figure 4:
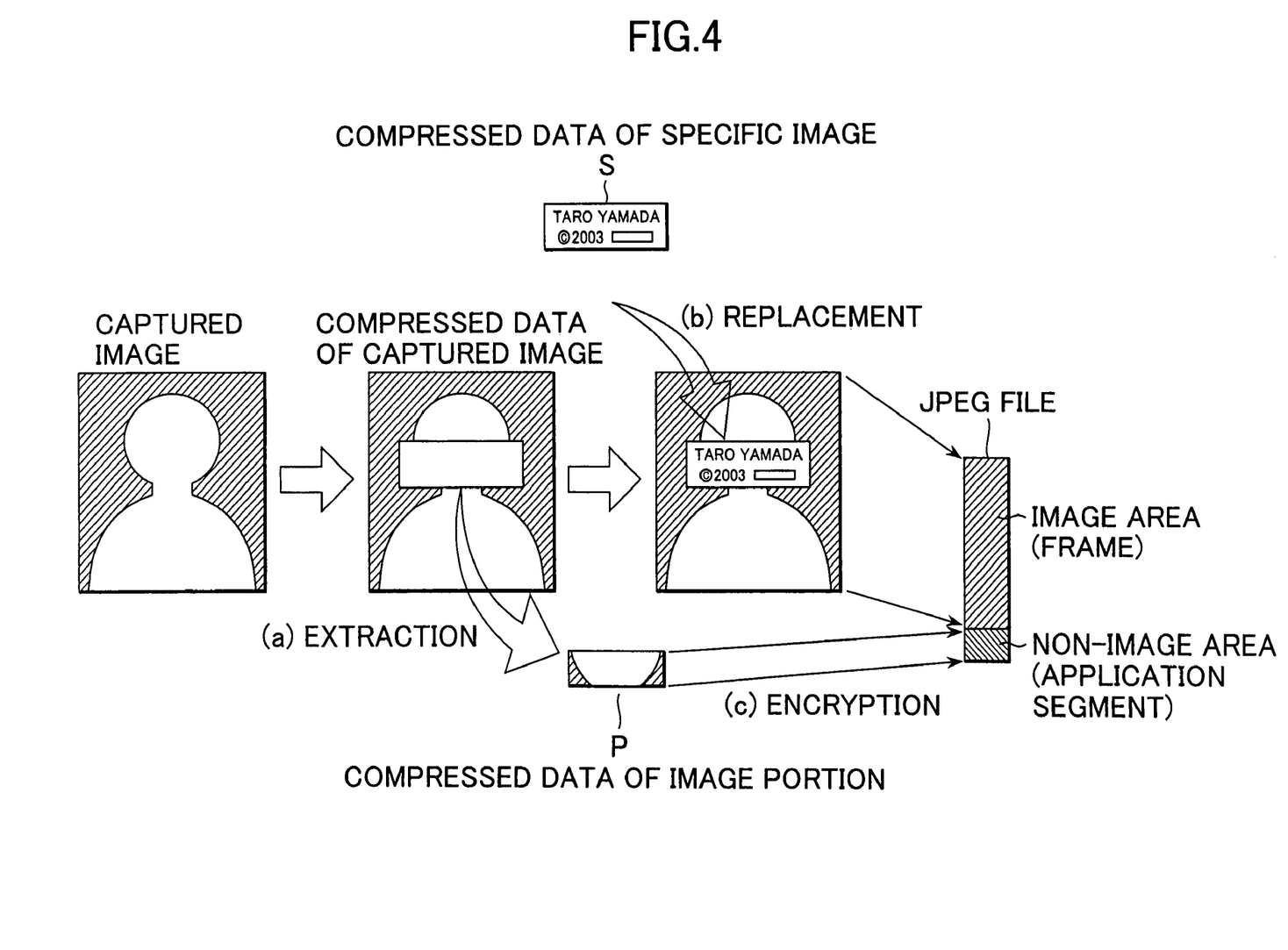
FIG. 4 schematically illustrates the specific image inserting operation.

FIGS. 3 and 4 schematically illustrate the specific image inserting operation. The following is an explanation of the specific image insertion processing given by following the sequence of the step numbers in FIG. 2.

In step S1, the image compression unit 23 executes JPEG compression on the captured image data and generates JPEG compressed data (a data stream). RST (restart) marker codes indicating specific positions within the image plane of the image data are attached to the JPEG compressed data by the image compression unit 23.

In step S2, the microprocessor 22 obtains a JPEG compressed data quantization table from the image compression unit 23. In step S3, the microprocessor 22 obtains data indicating the photographer ID entered and set in advance through the switch group 22a or the like and data indicating the photographing date/time input from a timer (not shown), and then generates a specific image for indicating copyright by laying out these data as an image. The specific image, which indicates copyright to enable an image identification, may be regarded as an identifier image.

For instance, the specific image 32 in FIGS. 3A to 3C includes a photographer name, a photographing year and a two-dimensional bar code 33 arranged therein. The two-dimensional bar code 33 is an image provided to allow the computer to machine-read information related to the copyright. In step S4, the microprocessor 22 executes JPEG compression on the specific image by using the quantization table obtained in step S2 and thus generates compressed data of the specific image. The microprocessor 22 attaches RST marker codes similar to those attached to the JPEG compressed data to the compressed data of the specific image as well.

The microprocessor 22 temporarily stores the compressed data of the specific image into the buffer memory 17. In step S5, the microprocessor 22 reads out the setting selected for the image plane range within which the specific image is to be inserted, and converts this image plane range to an RST marker position. For instance, FIG. 3A shows the image plane range for inserting the specific image set over a peripheral area of the image plane. Such an image plane range setting at which the specific image is not likely to conceal the main subject is ideal for checking an image on a monitor.

FIG. 3B shows the image plane range for the specific image insertion set near the center of the image plane. At this image plane range setting, the likelihood of the specific image concealing the main subject is high. For this reason, the original image cannot be readily used without first removing the specific image in an appropriate manner and thus, unauthorized use of the image can be effectively prevented. The image plane range setting may be selected in advance at the electronic camera 11, or it may be entered by the photographer through the switch group 22a or the like.

FIG. 3C shows an example in which a semitransparent specific image is inserted in the image. Such a semitransparent specific image can be generated by adding pixels corresponding to the specific image and pixels corresponding to an image portion (to be detailed later) at a predetermined ratio. It is to be noted that this pixel addition may be executed in an orthogonal transformation coefficient (e.g., a DCT coefficient or a wavelet transformation coefficient, as well).

This type of semitransparent specific image that allows the main subject to be scrutinized fully is suited for checking an image on a monitor. In addition, as long as the semitransparency of the specific image is set to an appropriate level, the copyright indicated in the specific image can be read with no problem. Moreover, with the semitransparent specific image set over the main subject the original image cannot be used readily unless the specific image is removed in an appropriate manner. As a result, unauthorized use of the image is prevented effectively.

In addition, by changing the level of the semitransparency of the specific image on screen, it can be made even more difficult to completely remove the specific image. In step S6, the microprocessor 22 searches the JPEG compressed data in units of the individual RST marker codes. In step S7, the microprocessor 22 selects the image plane range over which the specific image is to be inserted by using the RST marker code as a reference.

If a given image portion is judged to correspond to the image plane range, the microprocessor 22 shifts the operation to step S8. If, on the other hand, the image portion is judged not to correspond to the image plane range, the microprocessor 22 shifts the operation to step S10. In step S8, the microprocessor 22 extracts compressed data P of the image portion located within the image plane range from the JPEG compressed data, as shown in (a) of FIG. 4. The microprocessor 22 temporarily stores the extracted compressed data P of the image portion into the buffer memory 17.

In step S9, the microprocessor 22 writes the compressed data of the specific image over the compressed data of the image portion inside the image plane range of the JPEG compressed data. In step S10, the microprocessor 22 makes a decision as to whether or not the specific image insertion processing has been completed.

For instance, if the entire specific image has not yet been inserted, the microprocessor 22 shifts the operation to step S6. If the specific image has been inserted in its entirety, the microprocessor 22 shifts the operation to step S11. In step S11, the microprocessor 22 stores the compressed data of the complete processed image into a frame (an area that is referenced as image) of the JPEG file.

In step S12, the microprocessor 22 stores information indicating the image plane range in which the specific image has been inserted into an application segment (an area that is not referenced as image) of the JPEG file. In the following step S13, the microprocessor 22 encrypts the compressed data P of the image portion extracted from the image data, as shown in (c) of FIG. 4. This encryption may be achieved by adopting an encryption system of the known art such as a public key system or a common key system.

In step S14, the microprocessor 22 stores the encrypted data of the image portion into the application segment of the JPEG file. In step S15, the microprocessor 22 implements control on the recording unit 20 so as to store the completed JPEG file into the memory card 21. Through the sequence of operation described above, the processing for inserting the specific image into the image data as a digital watermark is completed.

Advantages of the First Embodiment

As explained above, a portion of the image data is replaced with the specific image to create a processed image in the electronic camera 11 in the first embodiment. By using this function, it becomes possible to attach data indicating the copyright or the like to the image data in the electronic camera 11 without imposing a heavy processing onus on the camera. The specific image thus attached maybe regarded as a so-called visible digital watermark.

As a result, an electronic camera 11, which is highly convenient for the photographer in that each of a great number of sets of image data he captures includes data indicating the copyright without fail is realized. In addition, the data of the processed image are stored into the image area (the data area referenced as image) of the image file in the electronic camera 11. Thus, the image data attached with the copyright information can be displayed and checked by using a general-purpose image display program (such as a Web browser or an image editing software program) without having to use a special, dedicated software program.

Since the image data attached with the copyright information can be displayed and checked with ease as described above, the ownership of the image data can be verified at a glance. Consequently, under circumstances in which large volumes of image data are gathered at a newspaper publisher during, for instance, the Olympic Games, the individual photographers can be identified with ease and with a high degree of reliability, which will prove highly convenient for the publisher, who has to manage and make selections from the large volume of image data.

Furthermore, the image portion having been replaced with the copyright information (the specific image according to the invention) is stored into the non-image area (the data area that does not referenced as image) of the image file.

A typical general-purpose image display program is normally not capable of reproducing the non image area as image. Thus, even if the copyright information can be deleted from the display image by using a general-purpose image display program, it is extremely difficult to reproduce the image portion as an image and restore the original image data. For this reason, unauthorized use of the image data can be prevented by adopting the first embodiment.

The image portion in the non-image area can be reproduced as an image through specific processing executed by using a dedicated image processing program to be detailed later. Consequently, the image portion reproduced by executing this dedicated image processing program can then be used to restore the original image data. As a result, the function of copyright indicating in the electronic camera 11 can be used by the photographer, who thinks the original image important, without having to worry about any irreparable change to the original image.

In addition, the processed image and the image portion are stored in a single image file, instead of being separately stored in a plurality of image files, in the electronic camera 11. Thus, it is not necessary to separately manage the processed image and the image portion or to compile a new file by rejoining them in a file for transfer to the outside, which simplifies the subsequent image management to the maximum extent.

Furthermore, since the image portion is stored in an encrypted form in the electronic camera 11, it is extremely difficult for a third party who does not know the proper decryption method (who does not have the key) to restore the original image. Thus, unauthorized use of the image data can be prevented with a high degree of reliability.

Moreover, the specific image is inserted as compressed data in the electronic camera 11. The processing that is executed without having to decompress the image data can be completed at even higher speed than the processing disclosed in Japanese Laid Open Patent Publication No. 2000-151411.

In addition, the processing described above can be achieved by replacing and extracting compressed data with small data volumes. For this reason, too, faster processing is realized. The electronic camera 11 specifies the image plane range in the compressed data stream in reference to an RST marker code. Thus, the image plane range can be specified easily and quickly even when the compressed data have undergone variable-length coding. This aspect, too, makes it possible to achieve higher speed for the processing according to the present invention.

Second Embodiment

Next, another embodiment is explained. It is to be noted that the structure adopted in the electronic camera in the second embodiment is identical to that of the electronic camera in the first embodiment (see FIG. 1). For this reason, an explanation of the individual components is omitted and the reference numerals in FIG. 1 are used in reference to the second embodiment as well.

Figure 5:
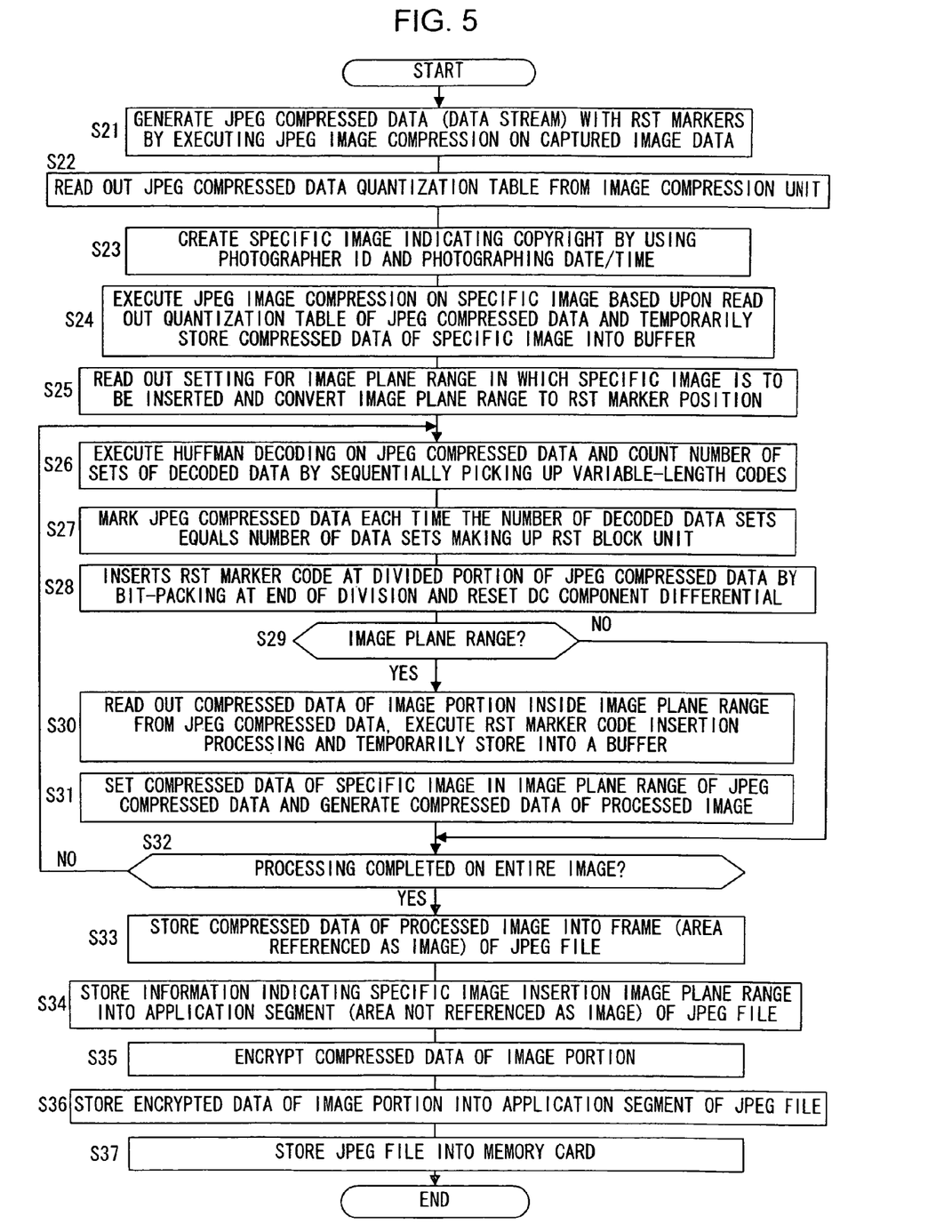
FIG. 5 presents a flowchart of the specific image inserting operation executed in a second embodiment.

FIG. 5 presents a flowchart of the specific image insertion processing executed in the second embodiment. The main feature that characterizes the second embodiment is that the image compression unit 23 generates JPEG compressed data which do not contain any RST marker code. The following is an explanation of the operation executed in the second embodiment, given by following the sequence of the step numbers in FIG. 5. In step S21, the image compression unit 23 executes JPEG compression on the captured image data and generates JPEG compressed data which do not contain any RST marker code.

The processing executed in steps S22 to S25 is identical to that executed in steps S2 through S5 in the first embodiment. In step S26, the microprocessor 22 executes Huffman decoding on the JPEG compressed data and counts the number of sets of the decoded data by sequentially picking up the variable-length codes. In step S27, the microprocessor 22 divides and marks the JPEG compressed data each time the number of sets of decoded data it has counted becomes equal to the number of data sets making up an RST block unit.

In step S28, the microprocessor 22 inserts the RST marker code at the divided portion of the JPEG compressed data by bit-packing at the end of the division. At this time, the microprocessor 22 writes the DC component value at the beginning of each block (resets the DC component differential value). In step S29, the microprocessor 22 selects the image plane range over which the specific image is to be inserted in reference to a delimiter in the JPEG compressed data (i.e., an RST marker code).

If a given image portion is judged to correspond to the image plane range, the microprocessor 22 shifts the operation to step S30. If, on the other hand, the image portion is judged not to correspond to the image plane range, the microprocessor 22 shifts the operation to step S32. In step S30, the microprocessor 22 reads out the compressed data of the image portion located within the image plane range from the JPEG compressed data. The microprocessor 22 then temporarily stores the compressed data of the image portion into the buffer memory 17. It is to be noted that if there is a marker included in the compressed data of the image portion, the microprocessor 22 executes the RST marker code insertion processing on the compressed data of the image portion.

In step S31, processing identical to that executed in step S9 in the first embodiment is executed. In step S32, the microprocessor 22 makes a decision as to whether or not the processing has been completed on the entire JPEG compressed data, i.e. the entire image. If there is still a portion of the image to be processed, the microprocessor 22 shifts the operation to step S26.

If the processing has been completed on the entire image, the microprocessor 22 shifts the operation to step S33. The processing executed in steps S33 to S37 is identical to that executed in steps S11 to S15 in the first embodiment. Through the operation sequence described above, the specific image can be inserted even in JPEG compressed data that do not contain any RST marker code.

Advantages of the Second Embodiment

As explained above, the second embodiment achieves advantages similar to those of the first embodiment. In addition, the JPEG compressed data are decoded and the number of sets of decoded data is counted by sequentially picking up the variable-length codes in the second embodiment. Thus, the image plane range over which the specific image is to be inserted can be correctly specified even when the compressed data do not contain any RST marker code, based upon the number of sets of decoded data.

Furthermore, the RST marker codes are inserted based upon the results of the decoded data set count in the second embodiment. As a result, the image plane range for the specific image can be specified subsequently by using the RST marker codes inserted at this time. Consequently, the replacement processing for the specific image and the image portion and the like can be executed freely with great ease.

Third Embodiment

Figure 6:
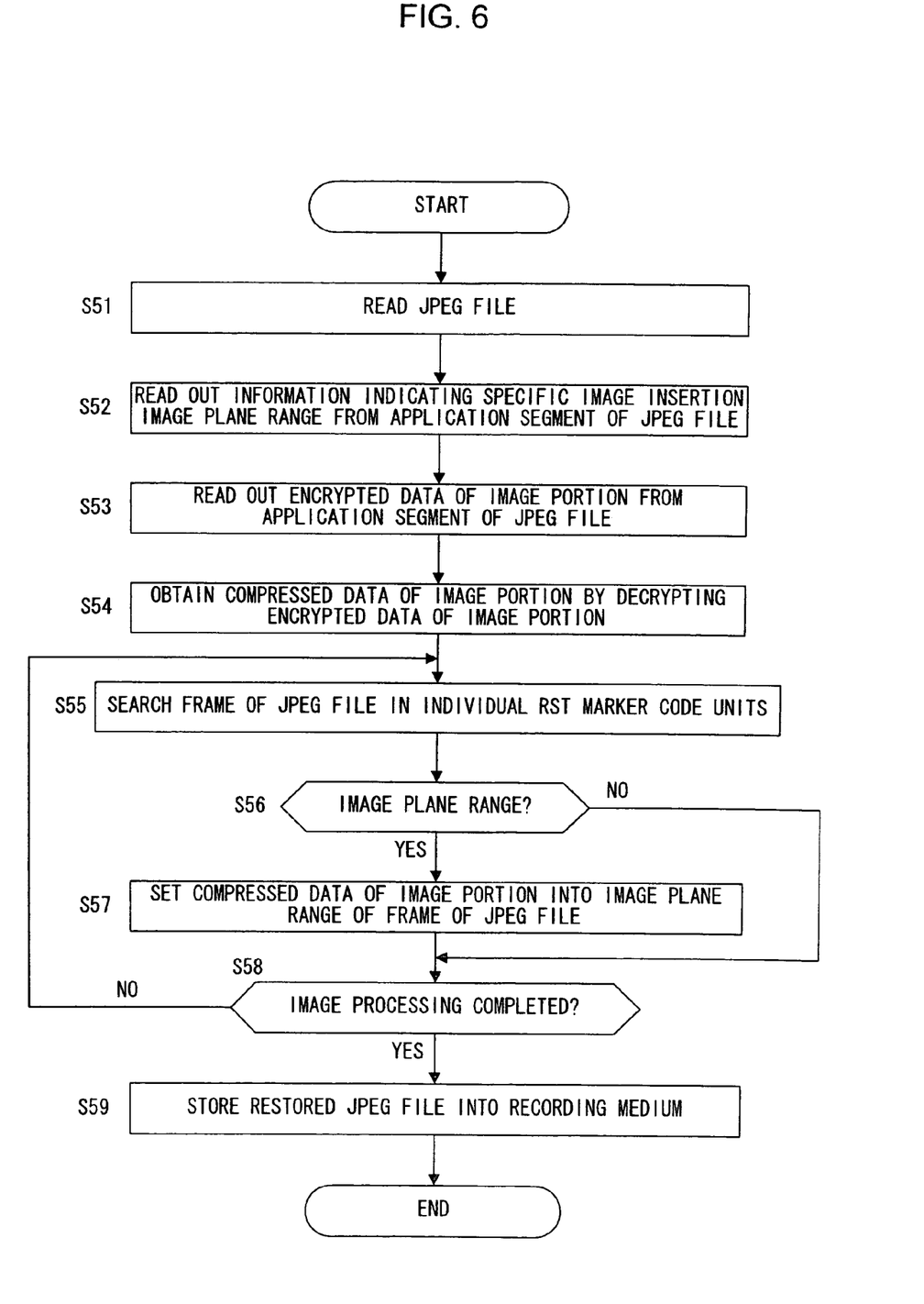
FIG. 6 presents a flowchart of the processing executed in conformance to the image processing program in a third embodiment.

Next, an image processing program in conformance to which an image file is restored is explained. This image processing program may be executed on the computer 31 shown an FIG. 1, for instance. FIG. 6 presents a flowchart of the processing executed in conformance to the image processing program. The following is an explanation of the operation given by following the sequence of the step numbers in FIG. 6. The computer 31 is a computer system that may be a personal computer, a workstation or the like. The image processing program is pre-installed in the computer 31.

In step S51, the computer 31 reads a JPEG file created in the electronic camera 11 via a recording medium 41 or a communication medium 42. The recording medium 41 may be a flash memory, a memory stick or an IC card. It may be instead a CD or a DVD. The communication medium 42 may be a medium connected through a specific interface cable (wired) or a wireless medium conforming to a specific standard, or it may be the Internet.

In step S52, the computer 31 reads out the information indicating the image plane range from the application segment of the JPEG file. In the following step S53, the computer 31 reads out the encrypted data of the image portion from the application segment of the JPEG file.

In step S54, the computer 31 decrypts the encrypted data of the image portion by using the decryption key set in advance and obtains the compressed data of the image portion. In step S55, the computer 31 searches the frame (the area in which the compressed data stream is stored) in the JPEG file in blocks each corresponding to a data unit containing an RST marker code.

In step S56, the computer 31 makes a decision as to whether or not the current data position in the frame being searched is inside the image plane range in which the specific image has been inserted based upon the RST marker code. If the data position is determined to be inside the image plane range in this step, the computer 31 shifts the operation to step S57. If, on the other hand, the data position is determined not to be inside the image plane range, the computer 31 shifts the operation to step S58.

In step S57, the computer 31 stores the compressed data of the image portion inside the image plane range ascertained through the search. In step S58, the computer 31 makes a decision as to whether or not there is any remaining image portion to be used for the replacement. If it is decided in this step that there is still a remaining image portion to be used for the replacement, the computer 31 shifts the operation to step S55.

If, on the other hand, it is decided that the image portion has been completely restored, the computer 31 shifts the operation to step S59. In step S59, the computer 31 stores the JPEG file which contains the restored original image into the recording medium. Through the sequence of the operation described above, the image having the specific image inserted therein can be restored as the original image.

Advantages of the Third Embodiment

As explained above, the original image is restored by using the data of the image portion stored in the non-image area (the application segment in this example) of the image file in the third embodiment.

In addition, the encrypted image portion must be decrypted in the third embodiment. Thus, it is extremely difficult for a third party who does not have the decryption key to restore the original image, and unauthorized use of the original image is effectively deterred. Also, the data of the original image are restored in the compressed state without necessitating any processing for decompressing the compressed data to enable a quick restoration of the compressed data of the original image.

Additional Explanation of the Embodiments

It is to be noted that an explanation is given above in reference to the embodiments on an example in which the specific image insertion processing is executed each time an image-capturing operation for a single frame is executed in the electronic camera 11. However, the present invention is not limited to this example. For instance, after image data or compressed data corresponding to a plurality of frames are accumulated in the buffer memory 17, the microprocessor 22 may execute the specific image insertion processing described earlier when the electronic camera 11 is not engaged in an image-capturing operation. In such a case, the processing according to the present invention can be executed without lowering the continuous shooting speed of the electronic camera 11.

In addition, the electronic camera 11 creates the compressed data of the specific image for each set of captured image data in the embodiments described above. However, the present invention is not limited to this example. For instance, a single specific image may be inserted in a plurality of sets of compressed data having been compressed based upon a single quantization table, by preparing compressed data of the specific image only for the first set of compressed image data and storing the compressed data of the specific image in the buffer memory 17. In this case, the compressed data of the specific image stored in the buffer memory 17 can be directly utilized for the subsequent sets of image data to further speed up the specific image insertion processing.

It is to be noted that an explanation is given above in reference to the embodiments on an example in which the present invention is adopted in conjunction with JPEG files. However, the present invention is not limited to any specific image file format. Rather, the present invention may be adopted, in principle, in conjunction with any image file having a non-image data area. For instance, it may be adopted in conjunction with a JPEG 2000 image file or the like.

It is to be noted that the data of the specific image having been removed from the image area are deleted in the third embodiment. This feature is effective in preventing a third party from reusing the specific image which may indicate copyright or the like.

Alternatively, instead of deleting the data of the specific image, the specific image may be encrypted and stored into the non-image area. This alternative, too, prevents a third party from reusing the copyright information. In addition, by adopting these measures, it becomes possible to reinsert the specific image in the original image having been restored by repeatedly executing the restoration processing (see FIG. 6) explained in reference to the third embodiment.

Figure 7:
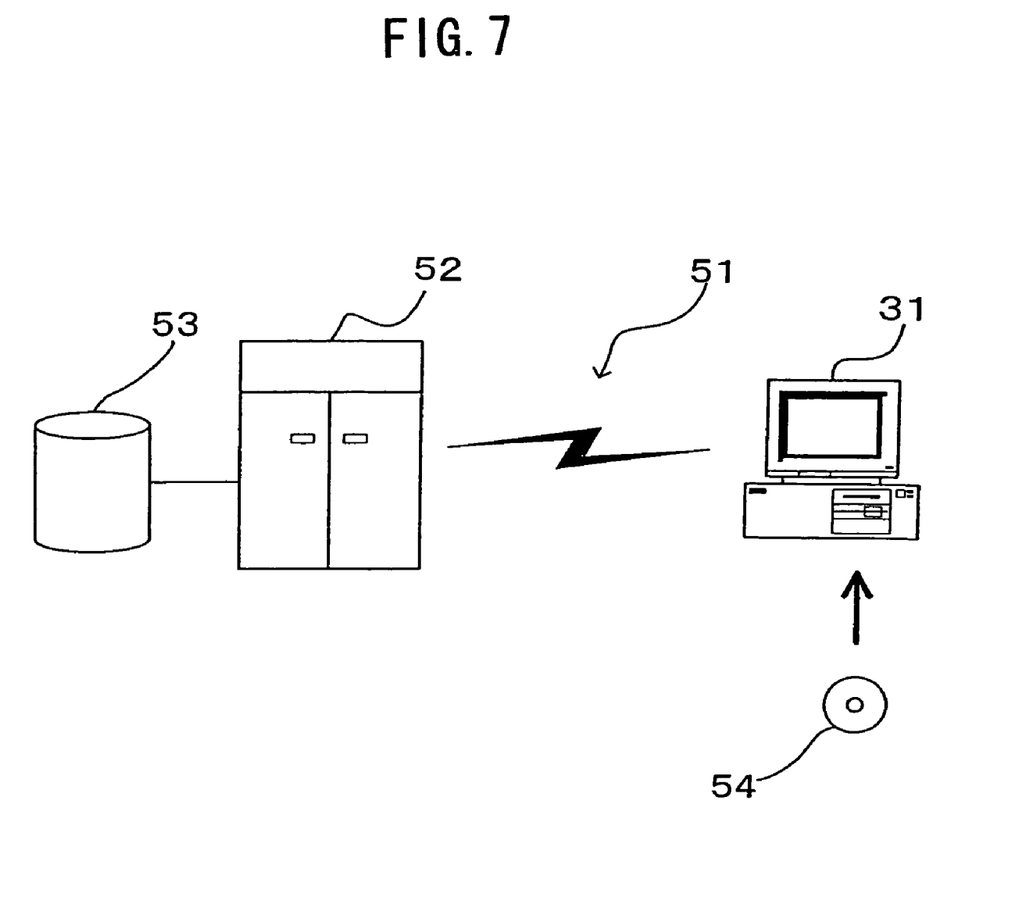
FIG. 7 shows how the image processing program executed on the computer is provided.

The image processing program executed on the computer 31 may be provided in a recording medium such as a CD-ROM or through a data signal on the Internet or the like. FIG. 7 shows how this may be achieved. The computer 31 is provided with the program via a CD-ROM 54. In addition, the computer 31 can be connected with a communication line 51. At a computer 52 constituting a server computer that provides the program, the program is stored in a recording medium such as a hard disk 53. The communication line 51 may be a communication line that enables Internet communication, personal computer communication or the like, or it may be a dedicated communication line. The computer 52 reads out the program from the hard disk 53 and transmits the program to the computer 31 via the communication line 51. Namely, the program embodied as a data signal on a carrier wave is transmitted via the communication line 51. In other words, the program can be provided as a computer-readable computer program product adopting any of various modes including a recording medium and a carrier wave.

It is to be noted that while an explanation is given above in reference to the embodiments on an example in which image files are created in the electronic camera, the present invention is not limited to this example. The present invention may also be adopted in conjunction with image files created in a scanner, a printer or the like. Namely, the present invention may be adopted in any of various types of apparatuses having an image-capturing element capable of generating image data which are then compiled into files.

In addition, the processing program executed in the electronic camera in the explanation given above in reference to the embodiments may instead be executed in an information processing apparatus such as a personal computer. In such a case, image data generated by capturing an image at an external image-capturing element are taken into the personal computer to undergo the processing therein. The processing program used for such processing, too, can be provided as a computer program product adopting any of modes similar to those that may be adopted for the image processing program described earlier.

As described above, in the electronic camera or the like according to the present invention, a portion of the image data is replaced with a specific image and the image portion replaced by the specific image is saved into the non-image area of the image file. This function makes it possible to create an image having a portion thereof replaced with a specific image used as a digital watermark, with only a light processing onus imposed on the electronic camera or the like while allowing the image to be restored into its original state.

The above described embodiments are examples, and various modifications can be made without departing from the spirit and scope of the invention.

The invention claimed is:

1. An electronic camera that creates an image file, which is a JPEG file, by processing image data obtained through an image-capturing operation, comprising:
    an image-capturing unit that generates the image data by capturing a subject image;
    an image compression unit that generates compressed data by executing image compression on the image data generated by the image-capturing unit, the compressed data including RST marker codes;
    a data extraction unit that sets an image plane range corresponding to an image portion of the image data, selects data corresponding to the image plane range from the compressed data based upon the RST marker codes, and extracts the selected data as data of the image portion;
    a data insertion unit that writes compressed data of a predetermined specific image over the data corresponding to the image plane range of the compressed data and generates data of a processed image; and
    a file creation unit that creates the image file by storing the data of the processed image into a frame, which is an image area of the JPEG file and is referenced as image data, and storing the data of the image portion into an application segment, which is a non-image area of the JPEG file and is not referenced as image data, wherein:
    the file creation unit includes an encryption unit that encrypts the data of the image portion and stores the data encrypted by the encryption unit into the non-image area.

2. An electronic camera according to claim 1, wherein: the predetermined specific image includes information related to copyright.

3. An electronic camera according to claim 1, wherein: the predetermined specific image includes at least information indicating a photographer name or a photographing data/time.

4. An electronic camera according to claim 1, wherein: the data insertion unit generates a semitransparent specific image as the predetermined specific image by adding pixels corresponding to the specific image and pixels corresponding to the image portion at a predetermined ratio, and writes data of the semitransparent specific image over the image plane range of the image data to generate the data of the processed image.

5. An image processing method for restoring an image comprising steps of:
    obtaining the image file that is the JPEG file and is created in an electronic camera according to claim 1;
    reading out the data of the processed image including the RST marker codes from the frame of the JPEG file;
    reading out the encrypted data of the image portion from the application segment of the JPEG file;
    obtaining the data of the image portion by decrypting the encrypted data of the image portion;
    specifying the compressed data of the predetermined specific image in the data of the processed image based upon the RST marker codes included in the data of the processed image; and
    writing the data of the image portion over the specified compressed data of the predetermined specific image.

6. A recording medium medium having an image processing program for restoring an image, the image processing program comprising instructions codes of:
    obtaining the image file that is the JPEG file and is created in an electronic camera according to claim 1;
    reading out the data of the processed image including the RST marker codes from the frame of the JPEG file;
    reading out the encrypted data of the image portion form the application segment of the JPEG file;
    obtaining the data of the image portion by decrypting the encrypted data of the image portion;
    specifying the compressed data of the predetermined specific image in the data of the processed image based upon the RST marker codes included in the data of the processed image; and
    writing the data of the image portion over the specified compressed data of the predetermined specific image.

7. An electronic camera that creates an image file, which is a JPEG file, by processing image data obtained through an image-capturing operation, comprising:
    an image-capturing unit that generates the image data by capturing a subject image;
    an image compression unit that generates compressed data by executing image compression on the image data generated by the image-capturing unit;
    a marker code insertion unit that inserts RST marker codes, which indicate positions within an image plane in the image data, into the compressed data generated by the image compression unit;
    a data extraction unit that sets an image plane range corresponding to an image portion of the image data, selects data corresponding to the image plane range from the compressed data based upon the RST marker codes, and extracts the selected data as data of the image portion;
    a data insertion unit that writes compressed data of a predetermined specific image over the data corresponding to the image plane range of the compressed data and generates data of a processed image; and a file creation unit that creates the image file by storing the data of the processed image into a frame, which is an image area of the JPEG file and is referenced as image data, and storing the data of the image portion into an application segment, which is non-image area of the JPEG file and is not referenced as image data, wherein:

the file creation unit includes an encryption unit that encrypts the data of the image portion and stores the data encrypted by the encryption unit into the non-image area.

8. An electronic camera according to claim 7, wherein:
the predetermined specific image includes information related to copyright.

9. An electronic camera according to claim 7, wherein:
the predetermined specific image includes at least information indicating a photographer name or a photographing date/time.

10. An electronic camera according to claim 7, wherein:
the data insertion unit generates a semitransparent specific image as the predetermined specific image by adding pixels corresponding to the specific image and pixels corresponding to the image portion at a predetermined ratio, and writes data of the semitransparent specific image over the image plane range of the image data to generate the data of the processed image.

* * * * *